United States Patent
Choi et al.

(10) Patent No.: US 10,320,003 B2
(45) Date of Patent: Jun. 11, 2019

(54) METHOD FOR MANUFACTURING CATHODE WITH IMPROVED MASS TRANSFER CAPABILITY AND CATHODE MANUFACTURED BY THE METHOD

(71) Applicants: HYUNDAI MOTOR COMPANY, Seoul (KR); KIA MOTORS CORPORATION, Seoul (KR); KOREA ADVANCED INSTITUTE OF SCIENCE & TECHNOLOGY, Daejeon (KR)

(72) Inventors: Jin Yi Choi, Guri-si (KR); Hoon Hui Lee, Seoul (KR); Gi Su Doo, Seoul (KR); Hee Tak Kim, Anyang-si (KR)

(73) Assignees: HYUNDAI MOTOR COMPANY, Seoul (KR); KIA MOTORS CORPORATION, Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 8 days.

(21) Appl. No.: 15/659,982

(22) Filed: Jul. 26, 2017

(65) Prior Publication Data
US 2018/0190995 A1    Jul. 5, 2018

(30) Foreign Application Priority Data

Dec. 30, 2016    (KR) .................. 10-2016-0183191

(51) Int. Cl.
  *H01M 4/88*     (2006.01)
  *H01M 4/92*     (2006.01)
  (Continued)

(52) U.S. Cl.
  CPC ....... *H01M 4/8878* (2013.01); *H01M 4/8828* (2013.01); *H01M 4/926* (2013.01);
  (Continued)

(58) Field of Classification Search
  CPC .. H01M 4/8878; H01M 4/926; H01M 4/8828; H01M 2004/8689; H01M 2008/1095
  (Continued)

(56) References Cited

U.S. PATENT DOCUMENTS

2013/0005567 A1* 1/2013 Kannan .................. B82Y 30/00
                                                                  502/185

FOREIGN PATENT DOCUMENTS

JP          4182231 B2    11/2008

* cited by examiner

*Primary Examiner* — Gary D Harris
(74) *Attorney, Agent, or Firm* — Morgan Lewis & Bockius LLP

(57) ABSTRACT

A method of manufacturing a cathode with improved mass transfer capability includes (a) mixing a metal-supported catalyst with an alkane compound having a thiol group and masking a surface of the metal-supported catalyst with the alkane compound having the thiol group by coating; (b) mixing the metal-supported catalyst masked with the alkane compound having the thiol group, with a polymer electrolyte and a solvent to produce a slurry and manufacturing the cathode using the slurry; and (c) producing a membrane electrode assembly (MEA) using the cathode, an electrolyte membrane and an anode and applying a voltage to the membrane electrode assembly to remove the alkane compound having the thiol group.

6 Claims, 9 Drawing Sheets

(51) Int. Cl.
  *H01M 8/1004* (2016.01)
  *H01M 8/1018* (2016.01)
  *H01M 4/86* (2006.01)

(52) U.S. Cl.
  CPC .. *H01M 8/1004* (2013.01); *H01M 2004/8689* (2013.01); *H01M 2008/1095* (2013.01); *Y02P 70/56* (2015.11)

(58) Field of Classification Search
  USPC ........................................................ 429/535
  See application file for complete search history.

METHOD FOR MANUFACTURING CATHODE WITH IMPROVED MASS TRANSFER CAPABILITY AND CATHODE MANUFACTURED BY THE METHOD

CROSS-REFERENCE TO RELATED APPLICATION

This application claims under 35 U.S.C. § 119(a) the benefit of priority to Korean Patent Application No. 10-2016-0183191 filed on Dec. 30, 2016, the entire content of which is incorporated herein by reference.

TECHNICAL FIELD

The present disclosure relates to a method of manufacturing a cathode with improved mass transfer capability and a cathode manufactured by the method, and more particularly, to a method of manufacturing a cathode, in which an ionomer is coated on the surface of platinum and deteriorates oxygen transfer capability so as to improve fuel cell performance at a high current density, and a cathode manufactured by the method.

BACKGROUND

Polymer electrolyte membrane fuel cells (PEMFCs) currently used among a variety of fuel cells have many advantages of low operation temperature and high energy efficiency and research is thus continuously underway on use of PEMFCs as power sources of vehicles.

That is, polymer electrolyte membrane fuel cells (PEMFCs) have advantages of high current density, low operation temperature of 60 to 80° C., and little corrosion and electrolyte loss, as compared to phosphoric acid fuel cells (PAFCs), molten carbonate fuel cells (MCFCs), solid oxide fuel cells (SOFCs) and the like.

In addition, the polymer electrolyte membrane fuel cells can stably supply power owing to benefits such as low cost, low volume, long stack life, and fast start-up and suitability for discontinuous operation and are thus utilized in a variety of applications including vehicles.

A membrane electrode assembly (MEA), which is a basic unit of the polymer electrolyte membrane fuel cell, is operated based on the following principle. A hydrogen ion produced by oxidation of hydrogen at an anode moves to a cathode via a polymer electrolyte as a medium and produces water by reduction with oxygen and an electron on the cathode, thus generating electricity (see FIG. 1). Oxygen reduction reaction having much higher activation energy than hydrogen oxidation reaction corresponds to a rate-determining step in a fuel cell and is an obstacle to the improvement of fuel cell performances.

Recently, as the demand for decrease in platinum catalyst amounts increases, improvement of performance of electrodes with low amounts of platinum catalysts has been an issue and active research is underway in order to improve oxygen transfer which should be considered upon using electrodes with low amounts of platinum catalysts.

Accordingly, there is a need for novel technologies that can facilitate oxygen transfer, prevent sulfone groups of an ionomer from being confined to a metal catalyst surface and thereby improve transfer of hydrogen ions by restricting a formation of an ionomer coating film on the metal catalyst surface, that is, that can improve the capability to transfer both oxygen and hydrogen ions based on spatial dualization of transfer routes for hydrogen ions and oxygen by controlling distribution of the ionomer in the electrode.

The above information disclosed in this Background section is only for enhancement of understanding of the background of the invention, and therefore, it may contain information that does not form the related art that is already known in this country to a person of ordinary skill in the art.

SUMMARY OF THE DISCLOSURE

The present disclosure has been made in an effort to solve the above-described problems associated with the related art.

According to the present disclosure, when a cathode is produced by coating a metal-supported catalyst with an alkane compound having a hydrophobic thiol group, mixing an ionomer as a polymer electrolyte with a solvent to prepare a slurry, producing an electrode by an ordinary method and then applying a voltage acceptable within the fuel cell thereto using cyclic voltammetry to remove the thiol group, in order to develop a fuel cell cathode for improving the capability to transfer two materials of oxygen and hydrogen ions, the cathode can exert improved performance even at a high current density due to improved oxygen transfer capability of the metal catalyst. The present disclosure has been designed based on this finding.

Accordingly, the present disclosure to provide a method of manufacturing a cathode with improved mass transfer capability.

The present disclosure also provides a cathode with improved mass transfer capability manufactured by the method.

In one aspect, the present disclosure provides a method of manufacturing a cathode with improved mass transfer capability including (a) mixing a metal-supported catalyst with an alkane compound having a thiol group to mask a surface of the metal-supported catalyst with the alkane compound having the thiol group by coating, (b) mixing the metal-supported catalyst masked with the alkane compound having the thiol group, with a polymer electrolyte and a solvent to produce a slurry and manufacturing the cathode using the slurry, and (c) producing a membrane electrode assembly (MEA) using the cathode, an electrolyte membrane and an anode and applying a voltage to the membrane electrode assembly to remove the alkane compound having the thiol group.

In another aspect, the present disclosure provides a cathode with improved mass transfer capability manufactured by the method.

Other aspects and embodiments of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
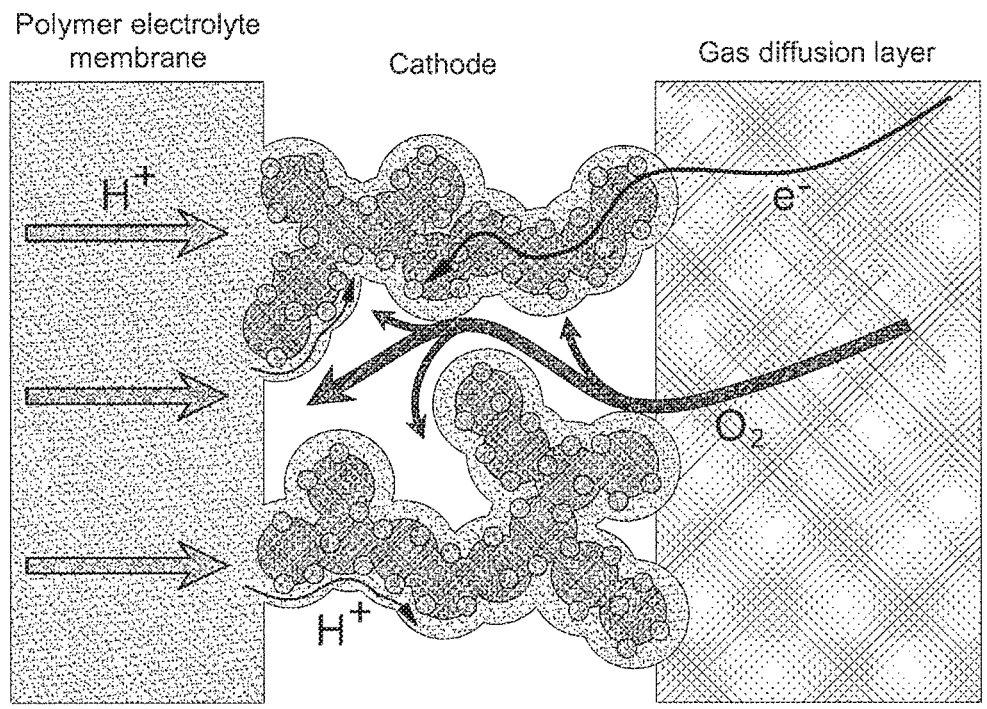
FIG. 1 shows a structure of a cathode for a fuel cell.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, exemplary embodiments of the present disclosure will be described in detail.

In general, a method of manufacturing an electrode for a fuel cell is carried out using a catalyst slurry. The catalyst slurry includes, as basic ingredients, a catalyst, a solvent and an ionomer (perfluorosulfonic acid; PFSA) and an electrode is manufactured by mixing these ingredients, coating (casting) and drying.

Typically, the catalyst is platinum on carbon (Pt/C), and the ionomer serves as both a medium for transferring hydrogen ions and a binder, and products such as Nafion, Aquivion, and the like are used.

Figure 2:
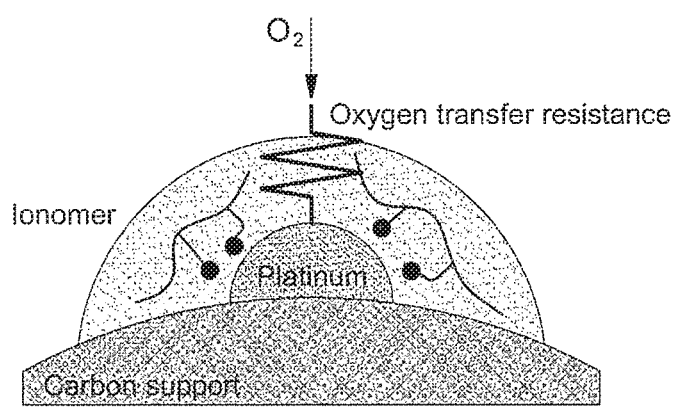
FIG. 2 is an image showing oxygen transfer resistance by an ionomer masking a platinum catalyst surface in a conventional cathode.

However, sulfone groups of the ionomer used have strong polar attraction with platinum and cover the surface of the platinum catalyst to form a nano-scale coating film, which inhibits oxygen transfer. That is, routes for transferring oxygen and hydrogen ions overlap, causing deterioration in efficiency of mass transfer (see FIG. 2).

Thus, it is necessary to design an electrode with improved mass transfer efficiency so as to make a balance of transfer between hydrogen ions and oxygen in the electrode.

Figure 3:
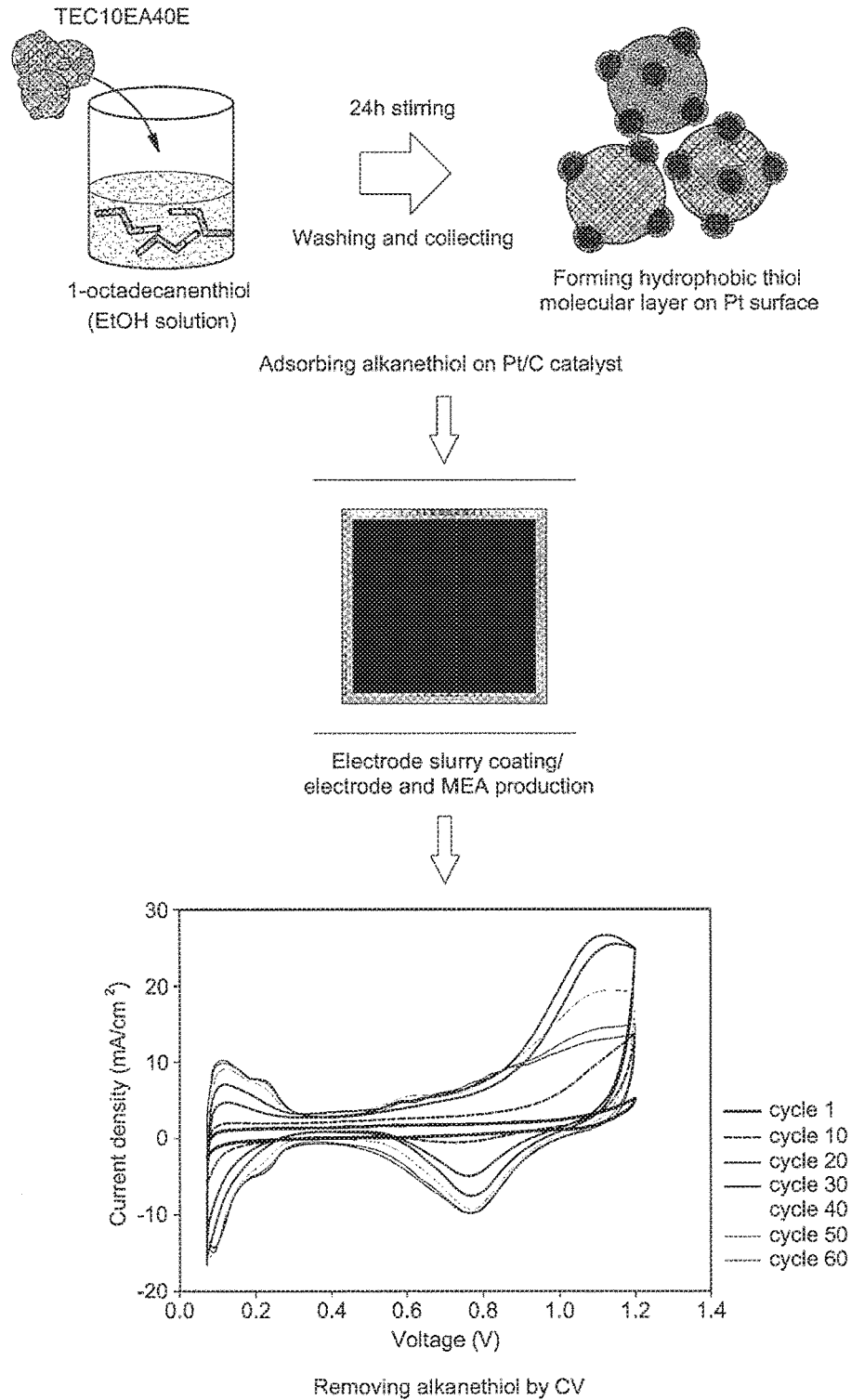
FIG. 3 shows a process of manufacturing a cathode according to the present disclosure.

Accordingly, the present disclosure provides a cathode produced by the following process to provide an electrode with improved mass transfer efficiency so as to make a balance of transfer between hydrogen ions and oxygen in the electrode. FIG. 3 shows a process of manufacturing the cathode according to the present disclosure.

Step (a): Masking Catalyst Metal Surface with Alkane Compound Having Thiol Group by Coating First, the present disclosure provides a step of mixing a metal-supported catalyst with an alkane compound having a thiol group and masking a surface of the metal-supported catalyst with the alkane compound having a thiol group by coating. At this time, the metal-supported catalyst may be platinum on carbon (Pt/C), but the present disclosure is not necessarily limited thereto.

Furthermore, the alkane compound having a thiol group is a $C_6$ to $C_{22}$ hydrophobic non-polar substance and includes one or more selected from the group consisting of 1-hexanethiol, 1-octanethiol, 1-decanethiol, 1-dodecanethiol, 1-hexadecanethiol, 1-octadecanethiol, 1-eicosanethiol, and 1-docosanethiol. In a certain embodiment, the alkane compound is 1-octadecanethiol.

In this case, the alkane compound having a thiol group may be used in an amount of 30 to 100% with respect to the weight of the Pt/C catalyst (platinum on carbon). In order words, with respect to 100 parts by weight of ethanol, the Pt/C (platinum on carbon) catalyst may be used in an amount of 1 to 3 parts by weight and the alkane compound having a thiol group may be used in an amount of 0.3 to 3 parts by weight.

Specifically, the alkane compound having a thiol group is mixed with an ethanol solution and a metal-supported catalyst is stirred for 18 to 36 hours, washed and then collected to obtain a final metal-supported catalyst. As a result, a hydrophobic thiol-molecular layer is formed on the surface of the metal.

Figure 4:
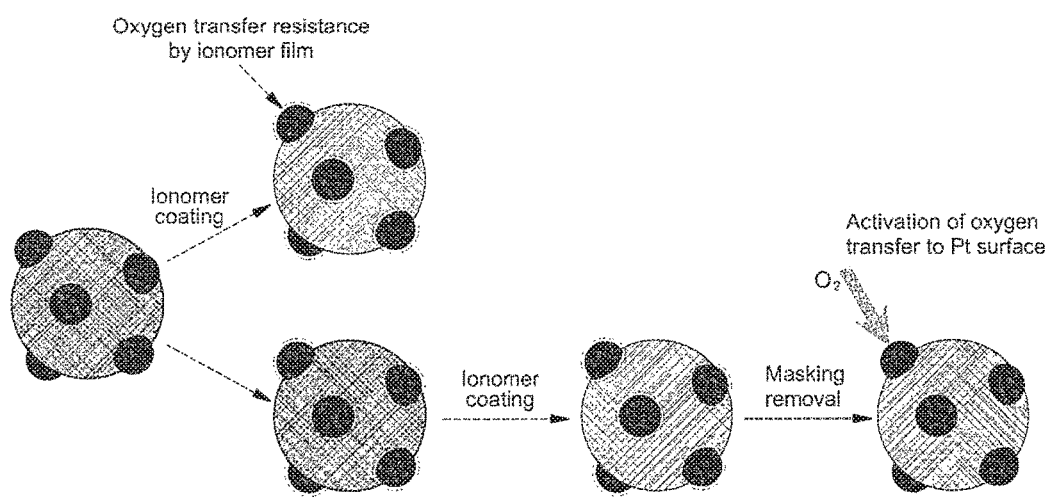
FIG. 4 is an image showing improved oxygen transfer capability resulting from non-masking of a platinum catalyst surface with an ionomer in the cathode according to the present disclosure.
Figure 5A:
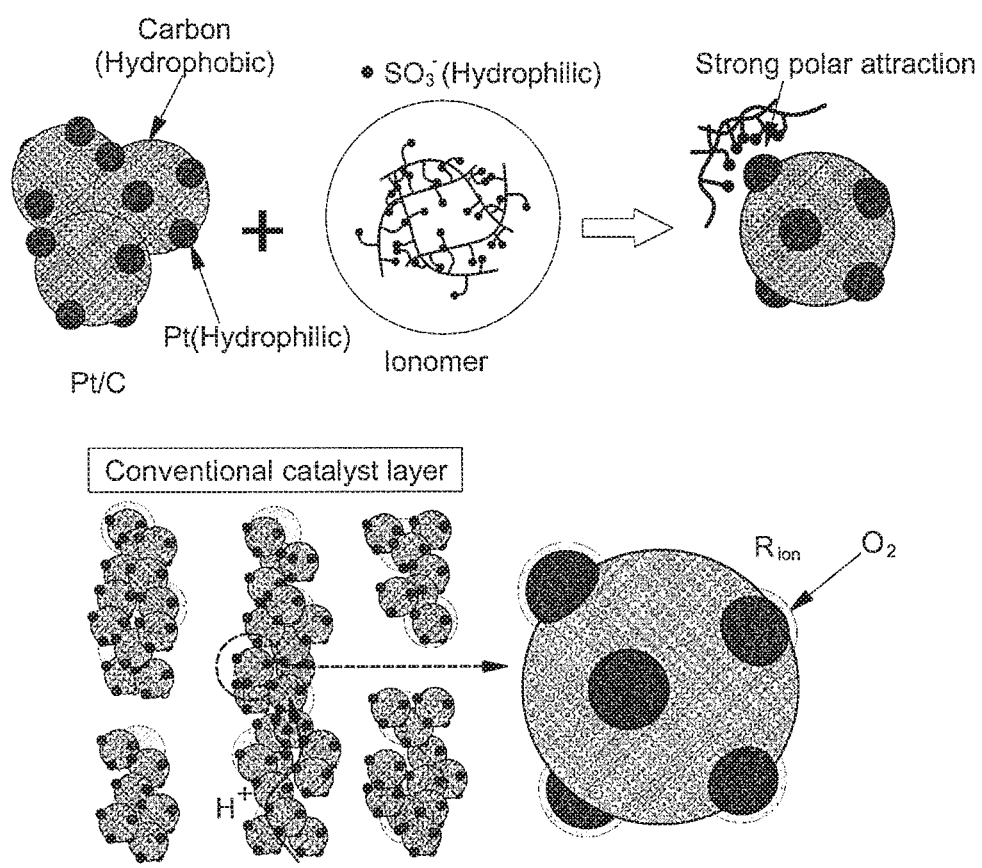
FIGS. 5A and 5B are schematic diagrams showing oxygen transfer capability depending on formation of an ionomer coating layer in the conventional cathode and the cathode according to the present disclosure.
Figure 5B:
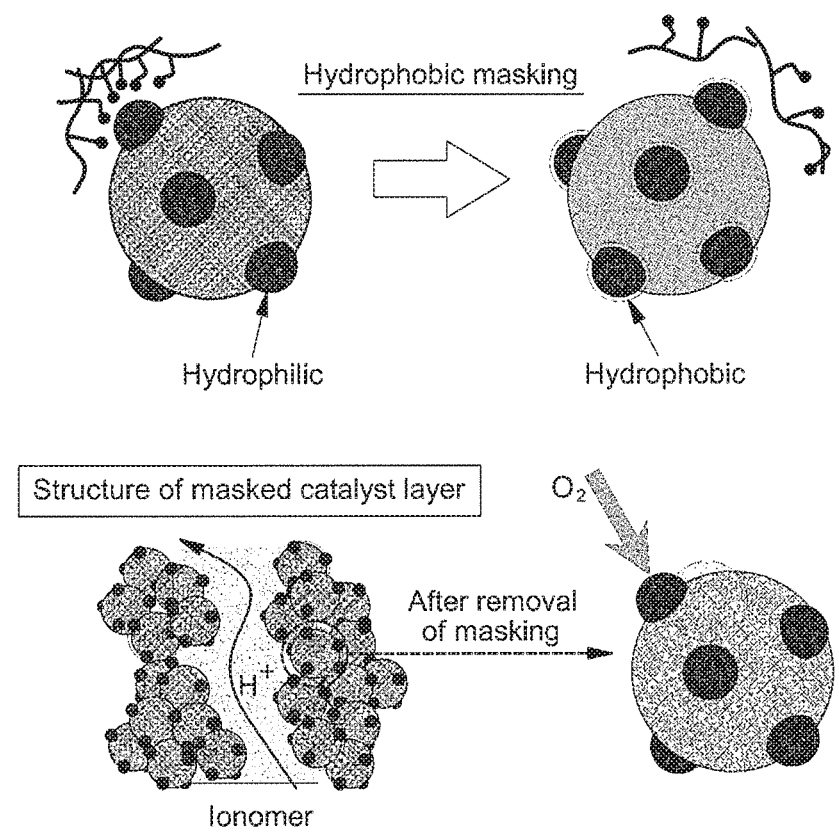

Eventually, step (a) according to the present disclosure serves to prevent the ionomer from being coated on the metal surface when producing a slurry with the ionomer. That is, the alkane compound having a thiol group selectively masks the metal, platinum, to reduce affinity between the ionomer and the catalyst, thereby inhibit formation of an ionomer film on the catalyst surface, improve an oxygen transfer capability and finally to enhance performance of the fuel cell at a high current density (see FIGS. 4 and 5). Furthermore, the ionomer as a polymer electrolyte can effectively exert both the inherent function of transferring hydrogen ions and the function as a binder.

Accordingly, step (a) of the present disclosure has an important role in controlling distribution of the ionomer in the electrode to spatially dualize transfer routes for hydrogen ions and oxygen, thereby improving capacities of transferring both substances.

Step (b): Manufacture of Cathode

The metal-supported catalyst including a thiol-molecular layer formed through step (a) is mixed with an ionomer and a solvent to produce a slurry. The slurry includes a mixture of diphosphoglyceric acid (DPG) and deionized water (1:1) as a solvent and is produced by adding 10 to 20% of the metal catalyst including a thiol molecular layer with respect to the weight of the solvent and 10 to 40% of the ionomer with respect to the weight of the Pt/C metal catalyst and conducting dispersion such as sonication and sputtering. The slurry can be coated on a suitable polymer film (PET, PEN or PI film or the like), followed by drying, thereby manufacturing a cathode. At this time, the ionomer may be a commercially available product of substituted perfluorosulfonic acid. Furthermore, the solvent is not limited to the solvents mentioned above.

Any method of manufacturing a cathode according to the present disclosure may not be limited so long as it is used in the art.

Step (c): Removing Alkane Compound Having Thiol Group from Metal Surface

Then, a membrane electrode assembly (MEA) is produced by a decal method using the cathode produced in step (b), an anode and an electrolyte membrane, and a voltage is then applied thereto by cyclic voltammetry to remove the alkane compound having a thiol group.

Figure 6:
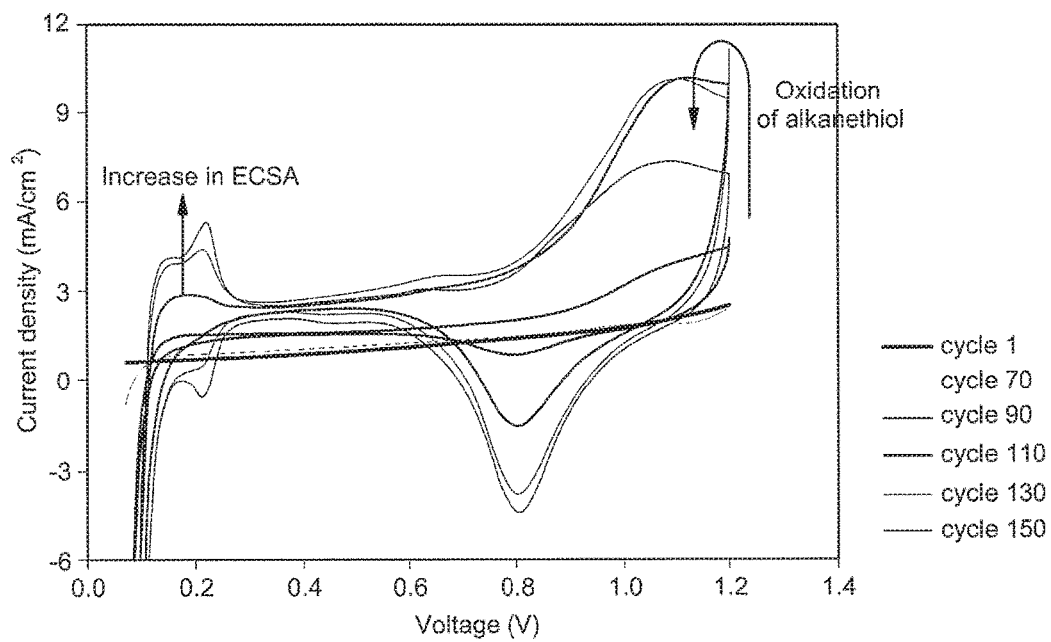
FIG. 6 shows current density measured in step (c) of removing an alkane compound having a thiol group through voltage application using cyclic voltammetry in the process of manufacturing the cathode according to the present disclosure.

The removal of the masked alkane compound having a thiol group can be conducted in the process of operating a fuel cell after manufacturing the membrane electrode assembly. It can be seen that the masked alkane compound having a thiol group is removed by cyclic voltammetry using a voltage acceptable in the fuel cell (see FIG. 6).

More specifically, cyclic voltammetry is a method of repeatedly applying a certain range of voltage to a subject. In the present disclosure, the voltage may be applied within the range of 0.05 to 1.2V at a rate of 30 to 100 mV/s. When an applied voltage exceeds 1.2V, a carbon support constituting an electrode may be oxidized. Thus, the voltage may be applied within the range defined above.

In addition, while supplying hydrogen gas ($H_2$) to the anode at a relative humidity of 100% and at a rate of 50 to 150 sccm and supplying nitrogen gas ($N_2$) to the cathode at a relative humidity of 100% and at a rate of 1000 to 2000 sccm, the alkane compound having a thiol group can be electrochemically detached by cyclic voltammetry. As the alkane compound having a thiol group is removed, electrochemically active surface area (ECSA) increases and then remains constant.

Furthermore, the number of cycles is calculated until the electrochemically active surface area (ECSA) remains constant and may be 130 to 180, but the present disclosure is not limited thereto.

The masking-free metal-supported catalyst has no ionomer film on the surfaces of catalyst particles to facilitate oxygen transfer and forms an ionomer channel due to hydrophobicity of metal catalyst particles to secure hydrogen ion transfer capability.

Accordingly, the cathode according to the present disclosure has a controlled distribution of ionomers therein and thus improves the capability to transfer both oxygen and hydrogen ions based on spatial dualization of transfer routes for hydrogen ions and oxygen, thereby improving current density of the fuel cell.

Hereinafter, the present disclosure will be described in more detail with reference to examples. However, the examples are provided only for illustration of the present disclosure and the scope of the present disclosure is not limited to the examples.

Comparative Example: Manufacture of Membrane Electrode Assembly (MEA) Using Conventional Cathode The slurry includes a mixture of diphosphoglyceric acid (DPG) and deionized water (1:1) as a solvent and was produced by adding 15% of the Pt/C catalyst with respect to the weight of the solvent and 20% of the ionomer with respect to the weight of the Pt/C metal catalyst and then conducting dispersion such as sonication and sputtering. The slurry can be coated on a suitable polymer film (PET, PEN or PI film or the like), followed by drying, thereby manufacturing a cathode. At this time, the ionomer may be a commercially available product of substituted perfluorosulfonic acid. A membrane electrode assembly (MEA) was produced by a decal method using the cathode, an anode and an electrolyte membrane.

Example: Manufacture of Membrane Electrode Assembly (MEA) Using Cathode According to the Present Disclosure 1 g of a platinum-supported catalyst (Pt/C) and 1 g of 1-octadecanethiol were added to 100 g of an ethanol solution, and the mixture was stirred for 24 hours and washed to prepare a platinum-supported catalyst (Pt/C) masked with an alkane compound having a thiol group. A membrane electrode assembly was manufactured using the masked platinum-supported catalyst in the same manner as in Comparative Example.

Then, the thiol group on the platinum surface was oxidized to remove the alkane compound having a thiol group, by applying a voltage of 0.07 to 1.2V at a rate of 50 mv/s, while supplying humidified hydrogen to the anode and the cathode of the manufactured membrane electrode assembly at 1,000 sccm and 1,500 sccm, respectively. As the thiol group was oxidized and then removed (as the number of cycles increased), the electrochemically active surface area (ECSA) increased and then remained constant, as can be seen from FIG. 6.

Test Example 1: Measurement of IV (Current-Voltage Curve)

Figure 7:
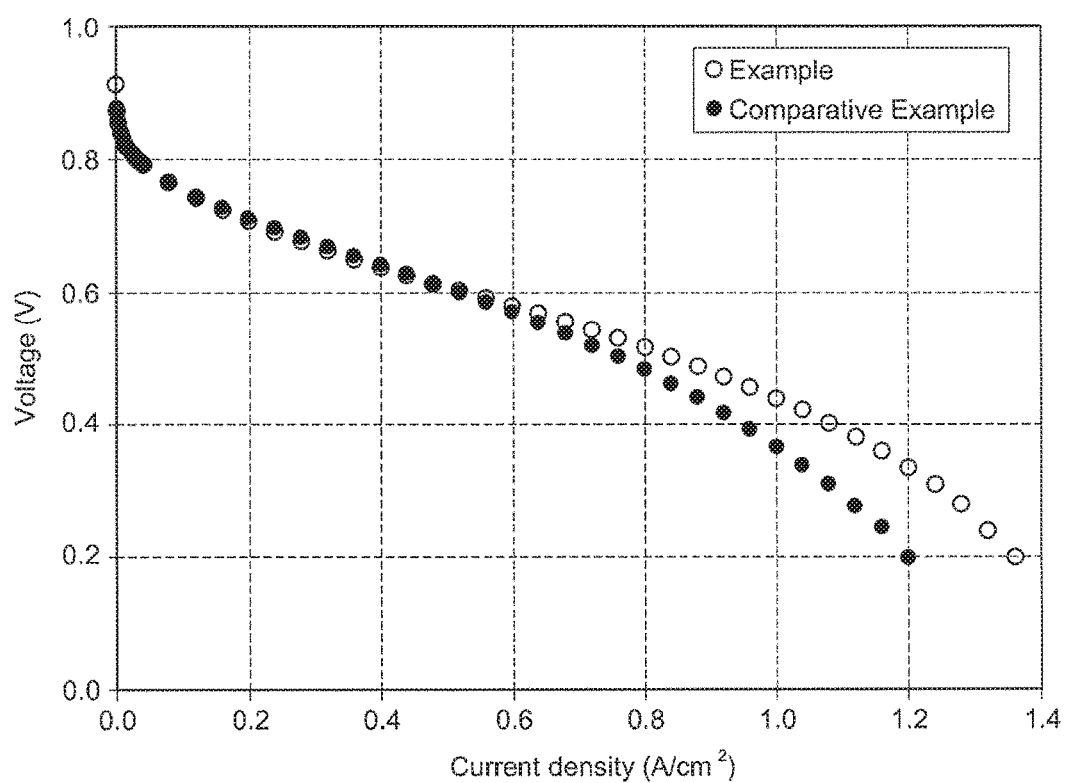
FIG. 7 shows IV performance of membrane electrode assemblies (MEAs) manufactured in Comparative Example and Example.

IV performances of the membrane electrode assemblies (MEAs) manufactured in Comparative Example and Example were measured and results are shown in FIG. 7.

As can be seen from the results of FIG. 7, the membrane electrode assembly including the cathode according to the present disclosure (Example) shows a 15% improvement in high current density (current density at 0.4V) than a conventional membrane electrode assembly (Comparative Example).

Test Example 2: Comparison in Oxygen and Hydrogen Ion Transfer Capacities

Figure 8A:
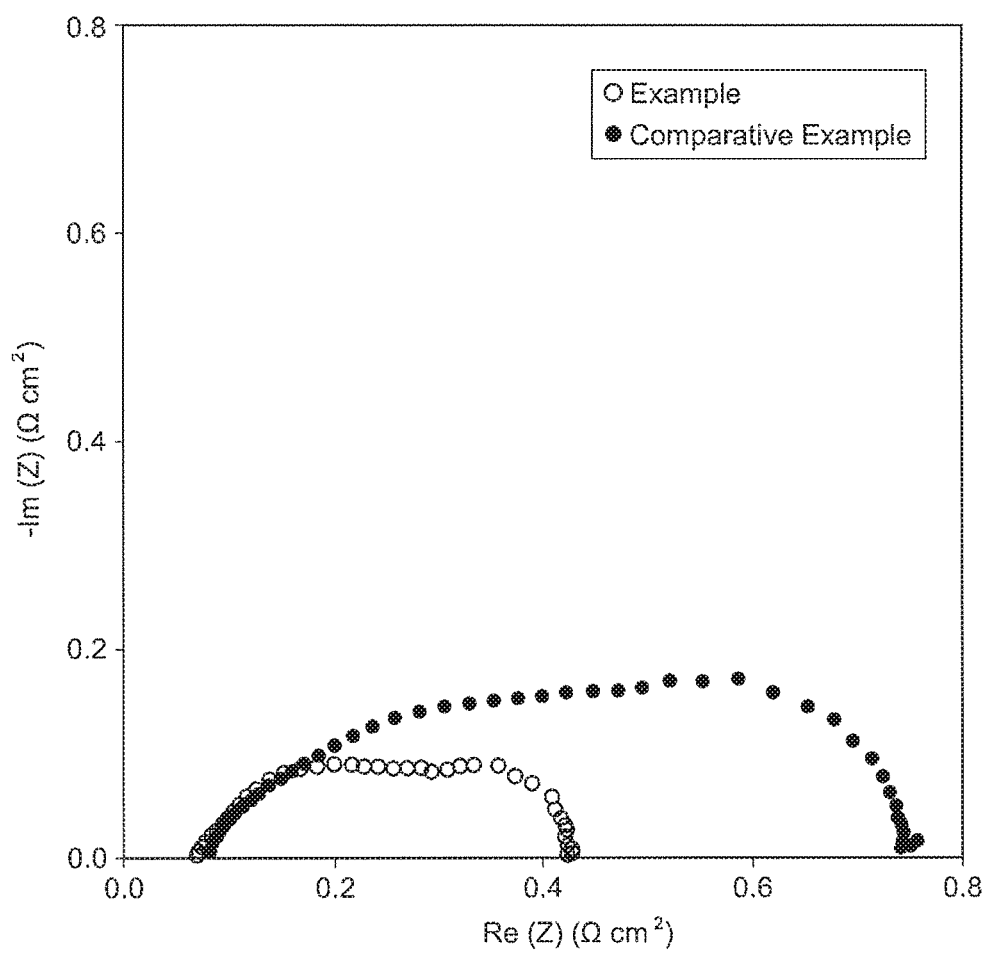
FIG. 8A shows cathode impedance of membrane electrode assemblies (MEAs) manufactured in Comparative Example and Example.
Figure 8B:
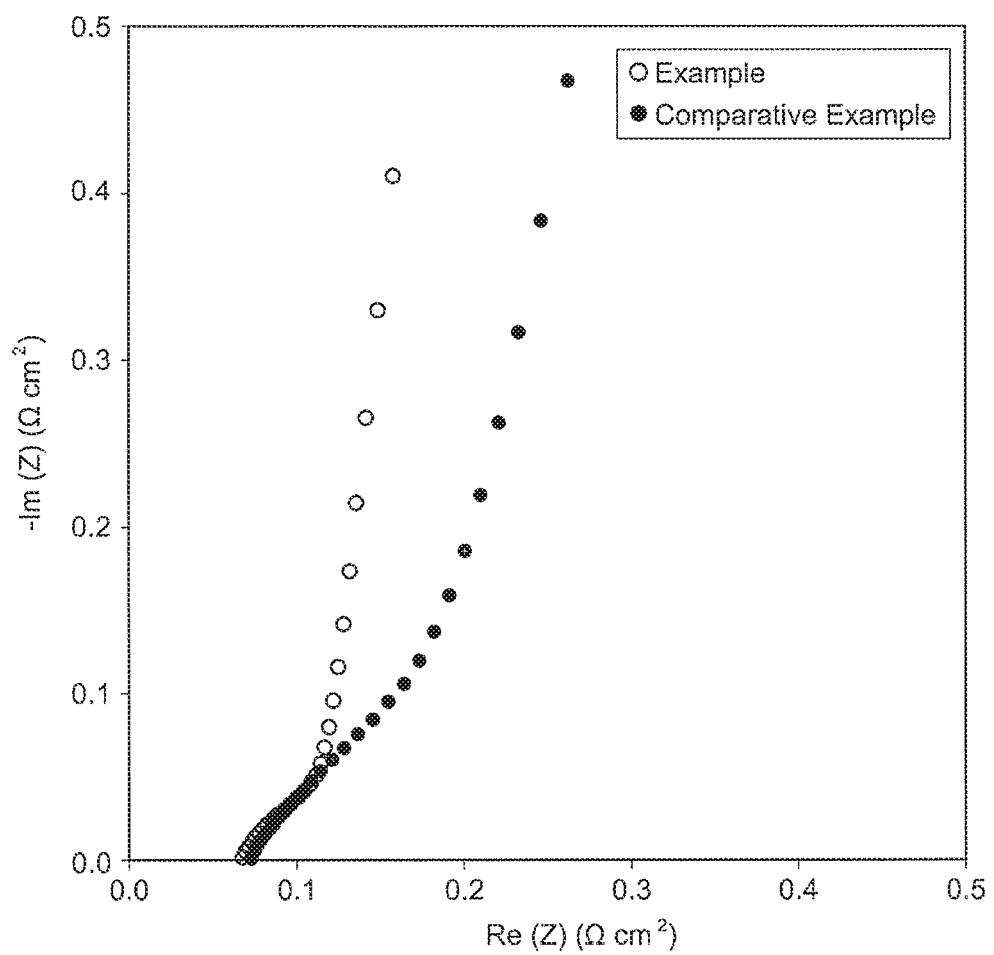
FIG. 8B shows transfer resistance values according to hydrogen ion transfer.

Impedance (substance transfer resistance) and hydrogen ion transfer resistance of the membrane electrode assemblies (MEAs) manufactured in Comparative Example and Example were measured and results are shown in FIG. 8.

As can be seen from the result of FIG. 8, the membrane electrode assembly including the cathode according to the present disclosure (Example) exhibits lower oxygen and hydrogen ion transfer resistance than a conventional membrane electrode assembly (Comparative Example).

Accordingly, the cathode manufactured by the method according to the present disclosure is an excellent disclosure capable of preventing formation of an ionomer film on the surfaces of catalyst particles to reduce the oxygen transfer resistance through the metal catalyst, reducing a hydrogen ion transfer resistance due to the ionomer channel formed in an area separated from the platinum catalyst, thereby improving performance of a fuel cell at a high current density.

As apparent from the foregoing, the cathode manufactured by the method according to the present disclosure prevents formation of a coating film by a polymer electrolyte due to low interaction between the polymer electrolyte and a metal catalyst in the electrode, improves the capability of transferring oxygen through the metal and improves the capability to transfer hydrogen ions of the polymer electrolyte in the electrode due to low interaction between sulfone groups of the polymer electrolyte and the metal catalyst.

That is, the cathode according to the present disclosure has a controlled distribution of ionomers therein and thus improves the capability to transfer both oxygen and hydrogen ions based on spatial dualization of transfer routes for hydrogen ions and oxygen. The improved capability of transferring both oxygen and hydrogen ions causes increased current density of the fuel cell.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A method of manufacturing a cathode with improved mass transfer capability comprising:
   step (a) mixing a metal-supported catalyst with an alkane compound having a thiol group and masking a surface of the metal-supported catalyst with the alkane compound having the thiol group by coating;
   step (b) mixing the metal-supported catalyst masked with the alkane compound having the thiol group, with a polymer electrolyte and a solvent to produce a slurry and manufacturing a cathode using the slurry; and
   step (c) producing a membrane electrode assembly (MEA) using the cathode, an electrolyte membrane and an anode and applying a voltage to the MEA to remove the alkane compound having the thiol group,
   wherein the voltage is applied to the produced MEA by cyclic voltammetry in step (c).

2. The method according to claim 1, wherein the metal-supported catalyst in step (a) is platinum on carbon (Pt/C).

3. The method according to claim 1, wherein the alkane compound having a thiol group in step (a) is a $C_6$ to $C_{22}$ hydrophobic substance.

4. The method according to claim 1, wherein the alkane compound having the thiol group comprises one or more selected from the group consisting of 1-hexanethiol, 1-octanethiol, 1-decanethiol, 1-dodecanethiol, 1-hexadecanethiol, 1-octadecanethiol, 1-eicosanethiol, and 1-docosanethiol.

5. The method according to claim 1, wherein the voltage is applied within a range from 0.05V to 1.2V at a rate of 30 to 100 mV/s by cyclic voltammetry in step (c).

6. A cathode with improved mass transfer capability manufactured by the method of claim 1 which comprises:
   (a) mixing a metal-supported catalyst with an alkane compound having a thiol group and masking a surface of the metal-supported catalyst with the alkane compound having the thiol group by coating;
   (b) mixing the metal-supported catalyst masked with the alkane compound having the thiol group, with a polymer electrolyte and a solvent to produce a slurry and manufacturing the cathode using the slurry; and
   (c) producing a membrane electrode assembly (MEA) using the cathode, an electrolyte membrane and an anode and applying a voltage to the membrane electrode assembly to remove the alkane compound having the thiol group,
   wherein the voltage is applied to the produced MEA by cyclic voltammetry in step (c).

* * * * *